(12) United States Patent
Patel et al.

(10) Patent No.: US 9,993,988 B2
(45) Date of Patent: Jun. 12, 2018

(54) PROTECTIVE FILM WITH RELEASE SURFACE

(71) Applicant: Tredegar Film Products Corporation, Richmond, VA (US)

(72) Inventors: Shailesh C. Patel, Chesterfield, VA (US); Bankim B. Desai, Chesterfield, VA (US); Gary M. Balakoff, Midlothian, VA (US); Paul E. Thomas, Terre Haute, IN (US)

(73) Assignee: TREDEGAR FILM PRODUCTS CORPORATION, Richmond, VA (US)

( * ) Notice: Subject to any disclaimer, the term of this patent is extended or adjusted under 35 U.S.C. 154(b) by 0 days. days.

(21) Appl. No.: 14/203,320

(22) Filed: Mar. 10, 2014

(65) Prior Publication Data

US 2014/0190612 A1 Jul. 10, 2014

Related U.S. Application Data

(63) Continuation of application No. 12/992,123, filed as application No. PCT/US2009/003844 on Jun. 26, 2009.

(Continued)

(51) Int. Cl.
*B32B 3/30* (2006.01)
*B32B 37/12* (2006.01)
(Continued)

(52) U.S. Cl.
CPC ............... *B32B 3/30* (2013.01); *B32B 33/00* (2013.01); *B32B 37/12* (2013.01); *B65G 49/069* (2013.01);
(Continued)

(58) Field of Classification Search
CPC ........... B32B 33/00; B32B 3/30; B32B 37/12; B32B 38/06; B65G 49/069; C09J 7/0253;
(Continued)

(56) References Cited

U.S. PATENT DOCUMENTS 4,629,643 A 12/1986 Curro et al.
5,008,139 A 4/1991 Ochi et al.
(Continued)

FOREIGN PATENT DOCUMENTS

CN 1689935 A 11/2005
CN 1845820 A 10/2006
(Continued)

OTHER PUBLICATIONS

Tredegar Corp., U.S. Statutory Invention Registration, Reg. No. US H1935 H, published Jan. 2, 2001, entitled, Combination Pouch and Release Sheet and Method for Producing Same.
(Continued)

*Primary Examiner* — Patricia L. Nordmeyer
(74) *Attorney, Agent, or Firm* — Karceski IP Law, PLLC

(57) ABSTRACT

Films (10) for use in protecting surfaces are disclosed and comprise at least one release layer (14) and optionally an adhesion layer (12) and/or an intermediate layer, the release layer (14) having a plurality of three-dimensional protrusions (13) that are either formed integral with the release layer or are discrete polymer beads applied to the release layer.

7 Claims, 7 Drawing Sheets

Related U.S. Application Data

(60) Provisional application No. 61/133,356, filed on Jun. 27, 2008.

(51) Int. Cl.
   *B32B 33/00* (2006.01)
   *B65G 49/06* (2006.01)
   *B29C 59/04* (2006.01)
   *B29C 63/00* (2006.01)
   *B32B 38/06* (2006.01)

(52) U.S. Cl.
   CPC ............... *C09J 7/203* (2018.01); *C09J 7/22* (2018.01); *B29C 59/046* (2013.01); *B29C 63/0056* (2013.01); *B32B 38/06* (2013.01); *Y10T 156/10* (2015.01); *Y10T 428/24355* (2015.01); *Y10T 428/24612* (2015.01)

(58) Field of Classification Search
   CPC ............... C09J 2201/32; B29C 59/046; B29C 63/0056; Y10T 156/10; Y10T 428/24612; Y10T 428/24355; Y10T 428/14; Y10T 428/1405; Y10T 428/1476
   See application file for complete search history.

(56) References Cited

U.S. PATENT DOCUMENTS

| | | | |
|---|---|---|---|
| 5,141,790 A * | 8/1992 | Calhoun | B05B 15/0456 428/143 |
| 5,344,681 A * | 9/1994 | Calhoun | C09J 7/02 428/202 |
| 5,589,246 A | 12/1996 | Calhoun et al. | |
| 5,897,930 A * | 4/1999 | Calhoun | B29C 59/022 428/156 |
| 6,166,142 A | 12/2000 | Zhang et al. | |
| 6,524,675 B1 * | 2/2003 | Mikami | B44C 1/105 428/156 |
| 6,689,441 B1 * | 2/2004 | Kim | B32B 27/08 428/354 |
| 6,759,110 B1 * | 7/2004 | Fleming | C09J 7/0232 428/156 |
| 7,534,478 B2 * | 5/2009 | Nonaka | C09J 7/0217 428/343 |
| 7,678,443 B2 * | 3/2010 | Schulz | B29C 59/022 428/156 |
| 2002/0086134 A1 | 7/2002 | Welygan et al. | |
| 2003/0017291 A1 * | 1/2003 | Fleming | C09J 7/02 428/40.1 |
| 2003/0082326 A1 * | 5/2003 | Yang | B32B 17/10018 428/40.1 |
| 2003/0129343 A1 * | 7/2003 | Galkiewicz | B44C 1/17 428/40.1 |
| 2003/0221770 A1 | 12/2003 | Meixner et al. | |
| 2005/0013958 A1 * | 1/2005 | Callahan | C09J 7/02 428/40.1 |
| 2005/0053768 A1 | 3/2005 | Friedman | |
| 2005/0112314 A1 | 5/2005 | Hamilton et al. | |
| 2005/0253276 A1 | 11/2005 | Yamanaka et al. | |
| 2006/0051551 A1 * | 3/2006 | Shikano | C09J 7/0207 428/40.1 |
| 2007/0039271 A1 * | 2/2007 | Fleming | C09J 7/00 52/459 |
| 2008/0078500 A1 * | 4/2008 | Sher | B29C 47/0021 156/289 |
| 2008/0299347 A1 * | 12/2008 | Ukei | B29C 47/0021 428/41.8 |

FOREIGN PATENT DOCUMENTS

| | | |
|---|---|---|
| JP | S5013306 B1 | 5/1975 |
| JP | H04115944 A | 4/1992 |
| JP | 11001205 | 6/1996 |
| JP | 3065000 U | 1/2000 |
| JP | 2002-219778 A | 8/2002 |
| JP | 2005-111937 A | 4/2005 |
| JP | 2005-309071 A | 11/2005 |
| JP | 2006-257247 A | 9/2006 |
| JP | 2007-504084 A | 3/2007 |
| JP | 2008-115287 A | 5/2008 |
| JP | 2008-311419 A | 12/2008 |
| KR | 1020040030535 A | 4/2004 |
| WO | WO 03060031 A1 * | 7/2003 ............... B44C 1/17 |
| WO | WO 2007/148849 A1 | 12/2007 |

OTHER PUBLICATIONS

Chinese Office Action dated Jun. 28, 2016, for Chinese Patent Application No. 201410209049.8.
Japanese Office Action dated Oct. 3, 2016, for Japanese Patent Application No. 2011-510518.
Japanese Office Action dated Oct. 28, 2016, for Japanese Patent Application No. 2015-143937.
Japanese Office Action dated Mar. 13, 2017, for Japanese Patent Application No. 2011-510518.
Korean Office Action dated Mar. 21, 2017, for Korean Patent Application No. 10-2016-7036459.
Chinese Office Action dated Feb. 23, 2017, for Chinese Patent Application No. 201410209049.8.
Korean Office Action dated Feb. 23, 2017, for Korean Patent Application No. 10-2015-7026793.
Japanese Office Action dated Jul. 2, 2017, for Japanese Patent Application No. 2016-093232.
Chinese Office Action dated Dec. 5, 2017, for Chinese Patent Application No. 201410209049.8.
Japanese Office Action dated Feb. 28, 2018, for Japanese Patent Application No. 2015-143937.

* cited by examiner

PROTECTIVE FILM WITH RELEASE SURFACE

CROSS-REFERENCE TO RELATED APPLICATIONS

This application is a continuation of U.S. patent application Ser. No. 12/992,123, filed Jan. 12, 2011, which is a 35 U.S.C. § 371 National Stage of Patent Cooperation Treaty Application No. PCT/US2009/03844, filed Jun. 26, 2009, which claims the benefit of the filing date of U.S. Provisional Patent Application No. 61/133,356, filed Jun. 27, 2008, the disclosures of which are incorporated herein by references in its entirety.

BACKGROUND

The disclosure relates to films for use in protecting substrate surfaces during manufacturing, storage, transport or use. The disclosure also relates to a method for making the films.

Surface protection films, also known as masking films, are typically used to provide a physical barrier to prevent damage, contamination, scratching, scuffing, or other marring of a substrate. Masking films may be used to provide such protection during manufacture, shipping, or storing prior to use of the substrate, for example. Such films may be used in numerous applications as protective coverings for surfaces, particularly for protecting relatively smooth surfaces, such as acrylics, polycarbonates, glass, polished or painted metals and glazed ceramics. Optical substrates for televisions, monitors, and other displays, for example, require masking films that both protect the surface and may be removed without damaging, leaving residues of an adhesive, or other contaminants or particulates on the surface.

Traditionally, masking films have comprised corona-treated films or adhesive-coated paper or film. Corona-treated films are films that have been exposed to an electrostatic discharge to oxidize the surface of the film. This oxidation increases the film's surface tension and attraction to polar surfaces. Such corona-treated films typically are smooth films and rely on very precise corona treatment to facilitate adhesion. Unless embossed, corona-treated films are typically subject to wrinkling, which makes it difficult to use and handle the films. A further disadvantage is that the adhesion promoting effects of corona treatment dissipate with time.

Generally, conventional masking films are relatively difficult to use and handle. Because masking films are designed to adhere to a surface, they may also adhere to themselves when the masking film is wound on a roll or the adhesion surface otherwise contacts a portion of the masking film. Blocking, as it is called, may result in processing difficulties including delays and wasted material. To reduce the tendency for self adherence, masking films may be coated with a weak adhesive. The weak adhesive on the masking film may prevent the film from adhering tightly to itself on the roll, however, the weak adhesive may also not provide sufficient adherence to the surface to be protected.

Other films may be provided with one matte surface opposite the adhesion surface; often called one side matte ("OSM") masking films. The irregularity of a matte surface does not provide a good surface for adhesion and provides antiblocking properties to the masking film.

There is a need for a masking film that has a low self adherence but provides sufficient adherence to a substrate to provide suitable protection. There is a further need for a masking film that has a cushioning effect and eases handling of flat substrates.

In other applications, it may be desired to use materials that do not adhere to the surface, but instead are interleaved with the substrates to provide a physical separation. Such applications are commonly used in manufacturing operations where, for example, optical grade glass or plastic substrates are tacked together. In such applications, paper or other materials are used to interleave with the substrates to protect against damage. The interleaving sheets are also used between stacked fragile and scratch sensitive substrates and to provide separation between very smooth optical substrates during shipment to end users.

Accordingly, there is also a need for low cost, non-adhering materials for use in protecting substrate surfaces.

SUMMARY

In an embodiment, a masking film comprises a polymeric film web having at least one three-dimensional release surface.

In one embodiment, the three-dimensional release surface comprises a plurality of raised protrusions formed integral with the film.

In one embodiment, the raised protrusions comprise a plurality of spaced-apart ribs In one embodiment, the three-dimensional release surface comprises polymer nubs.

In one embodiment, the masking film comprises an adhesion layer opposite the three-dimensional release surface.

These and other embodiments will become apparent upon a further reading of the specification with reference to the drawing and the appended claims.

DETAILED DESCRIPTION

Figure 1:
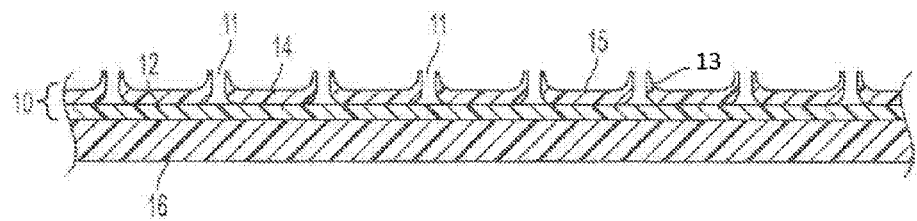
FIG. 1 is a cross sectional view of a masking film shown adhered to a substrate and comprising a release layer and an adhesion layer, wherein the release layer comprises a three-dimensional release surface having a plurality of apertured protrusions.

Masking films are described in U.S. Pat. Nos. 4,395,760; 5,100,709; 5,693,405; 6,040,046; 6,326,081; and 6,387,484 which are hereby incorporated by reference.

As used throughout this disclosure, the singular forms "a," "an," and "the" include plural reference unless the context clearly dictates otherwise. Thus, for example, a reference to "a layer" includes a plurality of layers.

A "laminate" or "composite," as used herein to describe webs or films are synonymous. Both refer to a web structure comprising at least two webs or films joined to form a multiple-layer unitary web. The webs may be coextruded or joined by a lamination process, including adhesive lamination, thermal lamination, pressure lamination, and combinations thereof, as well as other lamination techniques known to those in the art. Adhesives used to form the laminate may be any of a large number of commercially available pressure sensitive adhesives, including water based adhesives such as, but not limited to, acrylate adhesives, for example, vinyl acetate/ethylhexyl acrylate copolymer which may be combined with tackifiers. Other adhesives include pressure sensitive hot melt adhesives or double sided tape.

As used herein, the term "polymer" includes homopolymers, copolymers, such as, for example, block, graft, impact, random and alternating copolymers, terpolymers, etc., and blends and modifications thereof. Furthermore, unless otherwise specifically limited, the term "polymer" is meant to include all possible stereochemical configurations of the material, such as isotactic, syndiotactic and random configurations.

Handling of substrates having extremely flat surfaces such as panes of glass, sheets of optical material for monitors, televisions or other displays, or other similar substrates may be difficult. When trying to remove one sheet of such substrates from on top of another sheet, the sheets tend to stick together. The substrate sheets may stick together because air may not be present or be able to flow between the sheets. The lack of air results in a vacuum between the sheets and, at times, the second sheet will actually be lifted along with the first sheet. However, the second sheet may only lift a short distance before the vacuum is released and the second sheet falls. This drop may result in irreparable damage to the second sheet.

To provide a solution for this handling problem, embodiments of the masking film comprise a release layer having a three-dimensional release surface. In some embodiments, the masking film comprises an adhesion layer and a release layer with a three-dimensional release surface. In other embodiments, the masking film comprises two three-dimensional release surfaces located on opposite sides of the film. The masking films may comprise a single layer or multiple layers. Intermediate layers may be interposed between the adhesion layer and the release layer or between the two release layers.

Further embodiments include masking films comprising two release surfaces. Such masking films may additionally comprise intermediate layers between the release layers. Each release layer has a three-dimensional release surface. Embodiments comprising two release surfaces are advantageous for use in replacing paper elements in stacks of optical substrates.

Substrates with a masking film according to the embodiments placed between them are prevented from adhering to each other by creating a gap between stacked sheets allowing for an air space between the substrate sheets.

Generally, embodiments of the release layer comprise films. As used herein, a "film" refers to a thin sheet or web comprising a polymer. A film may be produced, for example, by extruding a molten thermoplastic polymer in an extrusion cast or blown process. The polymer may be further processed between rollers and cooled to form the web. Films can be monolayer films, coextruded films, and composite films, for example. Composite films may be produced by a coextrusion process or by bonding one or more films together.

A film may be dimensionally described as having a machine direction, a cross direction, and a z-direction. The machine direction is defined by the direction in which the film passes through the manufacturing process. Typically, films are produced as long sheets or webs which have a much longer length than width, in such a case the machine direction is usually the length (also referred to as the x-direction) of the sheet.

Perpendicular to the machine direction is the cross direction or traverse direction (also referred to as the y-direction or width) of the sheet. The thickness of the film is measured in the z-direction. The z-direction of a three-dimensional formed film includes the height of any three-dimensional features of the formed film and the thickness of the film.

A three-dimensional formed film is a film that has been processed to form three-dimensional features on at least one surface of the film. Therefore, three-dimensional formed films have a z-direction measurement, loft, that is significantly greater than the nominal thickness of the film. Typically, the loft is at least one and a half times the nominal thickness of the film. Examples of three-dimensional formed films are films that have a plurality of protrusions extending from a continuous land area which protrusions may be apertured or unapertured.

In certain embodiments the three-dimensional formed film may comprise a multiplanar film. Multiplanar films are films that have a continuous surface and a discontinuous surface spaced from one another in the z-direction. Multiplanar films are distinguished from three-dimensional films in that the protrusions may originate from either the continuous surface or the discontinuous surface, or both. Protuberances may be formed on any or all of the available planes. Examples of multiplanar films are disclosed in U.S. Pat. No. 7,518,032, the disclosure of which is incorporated herein by reference.

The three-dimensional features of the three-dimensional formed films may be produced using any suitable process. Most commonly, an embossing process, a hydroforming process, or a vacuum forming process, may be used to advantage. The three-dimensional features may have a cross-section that is circular, oval, triangular, square, pentagonal, hexagonal, or any other desired shape.

The pattern of the protrusions of the three-dimensional film may exist in either a regular geometric array or a random array. Typical arrays of regular geometric patterns can include, but are not limited to, continuous lines (raised ribs) that are straight or wavy, protrusions on straight or wavy lines, on a 60 degree equilateral triangle array, a square pattern array, or an array that has mixed spacing and angles but is repeating in clusters or groups of protrusions. Random arrays are random without any regular repeating pattern of individual protrusion or of clusters or groups of protrusions.

Formed films can be created, for example, by drawing a polymeric web against a forming structure using a vacuum or forcing the web against the forming structure using high pressure jets or air or water. Such processes are known from the teachings of US 2004/0119208 and US 2004/0119207, and the prior art references cited therein. The disclosure of these published applications, and those of the prior art cited therein, are incorporated herein by reference. In a direct cast vacuum formation process, a molten polymer is extruded from a die directly onto a forming structure and then subjected to vacuum to draw the polymer into apertures in the forming structure. The film is cooled, the shape of the film is set and the film is removed from the forming structure. The portions of the polymer that were drawn into the apertures in the forming structure result in the protrusions. The level of vacuum and other process parameters can be adjusted to draw the polymer into the apertures and form the protrusions without rupturing the film, or the process can be practiced to rupture the film to form apertures at the apex of the protrusion.

In other embodiments, the release layer may be a formed film created by a hydroforming process in which the three-dimensional protrusions are formed by directing high pressure streams of water against the surface of a polymer film while the film is supported on a forming structure. The high pressure water will force the film into apertures in a forming screen in the same manner as the vacuum to create the protrusions. In other embodiments, the release layer may be a formed film made in a reheat process in which a precursor polymeric film is heated to close to the melting point and then subjected to vacuum while supported on a forming structure as in the direct cast vacuum process described above. As used herein, the term "apertured formed film" refers to a three-dimensional formed film with apertures or holes at the apex of the protrusions of the film. The apertured formed film may be produced by the vacuum forming and hydroforming processes mentioned above in a manner to create the apertures in the apex of the protrusions.

In still other embodiments, the protrusions may be created by deforming the film using a pin plate as taught in U.S. Pat. No. 7,083,843, the disclosure of which is incorporated herein by reference. In other embodiments, the protrusions may be formed by deep embossing a precursor film, such as by passing a film through a nip formed between a first roll having a plurality of spaced protrusions and a second anvil roll having a smooth, hard surface. As the film is passed through the nip, the film is deformed in the areas corresponding to the protrusions from the first roll. Deep embossing is disclosed, for example, in U.S. Pat. No. 5,229,186, the disclosure of which is incorporated herein by reference.

For three-dimensional films, the z-direction dimension of the three-dimensional feature is a function of the diameter of the hole in the forming screen. Other factors also contribute to the z-direction height of the three-dimensional features such as film composition, basis weight of the film, and temperature of the film while being apertured. Typically, smaller diameter protrusions are shorter in z-direction than larger diameter apertures.

Three-dimensional formed films may comprise at least one thermoplastic polymer. For example, three-dimensional formed films may comprise at least one polymer selected from polyethylene, copolymers of polyethylene, low density polyethylene, linear low density polyethylene, high density polyethylene, medium density polyethylene, polypropylene, copolymers of polypropylene, blends of polyethylene and polypropylene, random copolymer polypropylene, polypropylene impact copolymers, polybutene, metallocene polyolefins, metallocene linear low density polyethylene, polyesters, copolymers of polyesters, plastomers, polyvinylacetates, poly (ethylene-co-vinyl acetate), poly (ethylene-co-acrylic acid), poly (ethylene-co-methyl acrylate), poly (ethylene-co-ethyl acrylate), cyclic olefin polymers, polybutadiene, polyamides, copolymers of polyamides, polystyrenes, polyurethanes, poly (ethylene-co-n-butyl acrylate), polylactic acid, nylons, polymers from natural renewable sources, biodegradable polymers or blends thereof.

Typically, the olefin monomer is either ethylene or propylene, but thermoplastic polyolefins may include higher molecular weight olefins. For example, polyolefins may also include polymers and copolymers of olefin monomers such as, but not limited to, ethylene, propylene, butene, isobutenes, pentene, methyl pentene, hexene, heptene, octene, and decene. Functionalized olefin monomers, such as linear low density polyethylene-g-maleic anhydride (LL-DPE-g-MA) available from E.I. du Pont de Nemours & Co., Inc., Wilmington, Del., under the trade designation BYNEL, may also be used.

The layers of the masking films can also contain elastic or semi-elastic polymers. Examples of such elastic, or semi-elastic polymers include low crystallinity polyethylene, metallocene catalyzed low crystallinity polyethylene, ethylene vinyl acetate copolymers (EVA), polyurethane, polyisoprene, butadiene-styrene copolymers, styrene block copolymers such as styrene/isoprene/styrene (SIS), styrene/butadiene/styrene (SBS), or styrene/ethylene-butadiene/styrene (SEBS) block copolymers, and blends of such polymers. Additionally, the elastic material may comprise other modifying elastic or non-elastomeric materials. Examples of elastomeric block copolymer are sold under the brand name KRATON, by Kraton Polymers, LLC.

Additionally, any of a variety of fillers may be added to the thermoplastic polymers and may provide certain desired characteristics, including, but not limited to, roughness, anti-static, abrasion resistance, printability, writeability, opacity and color. Such fillers are well known in the industry and include, for example, calcium carbonate (abrasion resistance), mica (printability), titanium dioxide (color and opacity) and silicon dioxide (roughness). Typically, the olefin monomer is either ethylene or propylene, but thermoplastic polyolefins may include higher molecular weight olefins. For example, polyolefins may also include polymers and copolymers of olefin monomers such as, but not limited to, ethylene, propylene, butene, isobutene, pentene, methyl pentene, hexene, heptene, octene, and decene.

The adhesion layer is capable of adhering to the surface of a substrate and the release layer provides a three-dimensional release surface which reduces the tendency of the film to adhere to itself when stored on a roll. In addition, the release surface can provide cushioning and protection to the surface of the substrate, without scratching the surface and may also allow protected surfaces to be handled more easily. The release layer can be formulated to provide a significant portion of the strength and protective properties to the masking film, if desired. The resins, additives and process variables of the contacting film surfaces are designed to eliminate any residue or stain transfer to the optical surfaces.

As will be appreciated from the above discussion, the loft of the protrusions may be varied by modifying the amount of vacuum pressure, fluid pressure, temperature, dwell time, aperture size in the forming structure and polymers used to make the film.

The thickness of an unembossed film is normally between 12.7μ and 152.4μ, but more typically within a range of 12.7μ and 76.2μ. After a deep embossing process, such a film will have three-dimensional features between 63.5μ and 1069μ. The deep embossed film for use as a component of a masking film may have between about 4 and about 120 macro cells per inch. In embodiments of the masking film, cells of the film have any shape and may be arranged in many patterns. The shapes of the cells include, but are not limited to, circles, ovals, diamond, boat shaped, ridges, channels, triangles, quadrilaterals or increasing multi-sided figures.

An embossed film may be made by any suitable process which adds three-dimensional features to the film. For example, a web of thermoplastic film may be fed through the nip of a driven pull roll or the web may be fed through the nip of embossing rolls, for example, to form the embossing or deep embossing. Other processes may be used to emboss the films with the desired properties and dimensions. Prior to the embossing process, the film may be preheated to facilitate embossing the film and set the features into the film after cooling. For example, spaced apart heaters on either side of the film may be used to raise the temperature of the film above its softening point. The heat softened film may then be passed into a nip formed by a metal embossing roll and a backup roll covered with an outer layer of a resilient material, such as a rubber, rubber-like material, or rubber silicone. In some embodiments, the backup roller may have a surface roughness to provide a matte surface on the film. For example, the backup roll may have a surface roughness of 5 to 150 microinch (0.127 to 3.81μ). In some applications, a rubber roll may be used and have a surface roughness between 30 and 100 microinch (0.762 and 2.54μ). In such an embodiment, the film is produced with a matte surface on one side and an embossed surface on the other.

In certain other embodiments, the film may then be passed into a nip formed by a polished metal roll, such as a high polish smooth chrome roll, and a rough backup roll. This process will produce film with a matte surface and a smooth opposite surface, such a film has one release surface and may be laminated with an adhesion layer or may be laminated to other layers that provide a second release surface, for example.

An adhesion layer is a layer of material that has some adhesive properties to smooth or rough surfaces and may be formed into a coherent monolayer. In use, the adhesion layer is applied to the surface to be protected. In certain embodiments, the masking films of the present disclosure achieve the desirable wetting and adhesion characteristics without an adhesive coating. In preferred embodiments of the masking film, the adhesion layer comprises a smooth surface having a roughness of from 0 to 60 microinch (0 to 1.524μ), or more preferably, between 0 and 30 microinch (0 and 0.762μ).

The adhesion layer may comprise a polymer. The polymer of the adhesive layer may be at least one polymer selected from polyethylene, low density polyethylene, linear low density polyethylene, high density polyethylene, medium density polyethylene, polypropylene, random copolymer polypropylene, polypropylene impact copolymers, metallocence polyolefin, metallocene linear low density polyethylene, plastomers, poly (ethylene-co-vinyl acetate), copolymers of an acrylic acid, poly (ethylene-co-acrylic acid), poly (ethylene-co-methyl acrylate), cyclic olefin polymers, polyamides, or poly (ethylene-co-n-butyl acrylate).

Embodiments of the masking film of the present disclosure comprise an adhesion layer comprising a metallocene polyolefin. As used herein, a "metallocene polyolefin" is a polyolefin produced by a metallocene catalyzed polymerization of olefin monomers. Typically the olefin monomer is either ethylene or propylene, but metallocene polymerizations may include a catalyst that may polymerize higher molecular weight olefins. Metallocene polyolefins also include copolymers of olefins produced by a metallocene catalyzed polymerization process, such as copolymers of any combination of olefin monomers such as, but not limited to, ethylene, propylene, butene, isobutenes, pentene, methyl pentene, hexene, heptene, octene, and decene, for example, metallocene poly (ethylene-co-octene) copolymers. Blends of metallocene polyolefins may also be used, as well as blends of metallocene polyolefins with other polymers. Metallocene polyolefins differ from polyolefins prepared by different polymerization processes. Metallocene polyolefins may be characterized by narrow molecular weight distributions of less than 2.0, controlled polymer structure, higher thermal stability, higher clarity, and higher impact resistance. Based upon such properties, one skilled in the art may easily discern between metallocene polyolefins and polyolefins produced by other processes. Metallocene polyolefins are commercially available, for example, from Dow Chemical Corp. and other resin suppliers.

Any metallocene polyolefin having the desired properties may be used in embodiments of the masking film. For example, metallocene polyolefin selected from the group of polymers comprising metallocene polyethylenes, metallocene polypropylenes, and metallocene copolymers comprising monomer units derived from ethylene and propylene may be used in the adhesion layer of the masking film. Such polymers provide a desired level of adhesive and cohesive properties. Metallocene copolymers may also provide the desired properties to the adhesion layer of the masking films. Particularly, metallocene copolymers comprising monomer units derived from ethylene higher α-olefins having 3 to 12 carbon atoms, for example, a metallocene poly (ethylene-co-octene). Though other metallocene copolymers may also be used, such as metallocene copolymers comprising monomer units derived from ethylene, propylene, butene, pentene, hexene, and octene. In certain embodiments, it may be advantageous for the adhesion layer of the masking film to comprise a metallocene copolymer comprising monomer units derived primarily of polyethylene and additional monomer units derived from butene, pentene, hexene, octene, or a combination of these monomers. Blends of metallocene polyolefins may also be used.

Embodiments of the masking films include metallocene polyolefins having a molecular weight distribution (i.e., polydispersity) greater than 1.0 and less than 2.0, or in certain embodiments, metallocene polyolefins having a molecular weight distribution of less than 1.7 may be desired or even a molecular weight distribution greater than 1.0 and less than 1.5.

In addition, the adhesion layer may comprise polymers comprising metallocene polyolefins as blocks of the polymer, wherein the other blocks may or may not comprise a metallocene polyolefin. Such block copolymers are considered metallocene polyolefins as the term is used herein.

An embodiment of a two layer masking film comprises an adhesion layer and a release layer. The adhesion layer comprises a blend of metallocene polyethylene and a low density polyethylene. The release layer comprises low density polyethylene and has a release surface comprising a plurality of protrusions.

In such embodiments, the adhesion layer may be from 5% to 30%, or in other embodiments from 15% to 25%, of the film based upon the total thickness of the masking film and the release layer may be the remaining 70% to 90%, or in other embodiments from 75% to 85%, of the total thickness of the masking film. In a more specific embodiment, the adhesion layer is 15% to 20% of the film. The masking film may comprise any polymers that give the desired properties.

However, in one embodiment, the adhesion layer consists essentially of 75% to 85% of a metallocene poly (ethylene-co-octene) copolymer and 15% to 25% of a low density polyethylene. This embodiment has specific properties that allow rapid and sufficient wetting of low surface energy substrates such as, but not limited to substrates comprising glass, acrylates, cyclic olefin polymers ("COP") films, or triacetyl cellulose ("TAC") films.

The masking films have particular use in the manufacture of optical films for LCD displays such as optical grade light management film (polarizers) used in an LCD assembly. In certain applications, the metallocene poly (ethylene-co-octene) copolymer may be replaced with a metallocene plastomer or other metallocene polyolefin. TAC films are typically used as polarizer protective layers in the manufacture of LCD's. TAC polymers formed with the low stresses of solvent casting result in a unique polymer system that meets the requirements of extremely isotropic LCD coversheets. Such properties have allowed solvent cast TAC films to capture the vast majority of LCD coversheet applications. However, the TAC is a soft film and when produced and rolled, the smooth front and back film surfaces have a tendency to stick or block together and generate poor wound roll quality. This may lead to defects in the LCD assembly. The masking film of the present disclosure protects and allows easier handling of TAC films better than other combinations of constituents and structures of masking films. Thus, TAC films, when masked with films of this disclosure may be used more successfully and efficiently for LCD assemblies.

Embodiments of the masking film with different adhesion levels may be produced by incorporating the constituents in different percentages of certain polymers and co-polymers in the adhesion surface of the masking film.

Secondary polymers such as polyolefins (homopolymers or co-polymers), polyvinyl alcohol, polyvinyl chloride, nylon, polyesters, styrenes, polybutylenes, polymethylpentene, plastomers, poly (ethylene-co-vinyl acetate), poly (ethylene-co-acrylic acid), poly (ethylene-co-methyl acrylate), cyclic olefin polymers, polyamides, or poly (ethylene-co-n-butyl acrylate) and polyoximethylene, and mixtures thereof, can be blended with the primary polymer at varying ratios to provide the desired level of adhesion of the film. Acid-modified co-polymers, anhydride-modified co-polymers and acid/acrylate-modified co-polymers also are useful. Films of polyethylene are particularly suited and therefore preferred. Films of low-density polyethylene homopolymers are even more particularly suited, and therefore more preferred, due to their relatively low tensile modulus which tends to conform better to surfaces.

The masking film may be any desired thickness. However, in certain applications, the total thickness of the masking film is from 60μ to 200μ.

An embodiment of a masking film is shown in FIG. 1. In FIG. 1, the masking film 10 is shown on substrate 16. Masking film 10 comprises an adhesion layer 12 and a release layer 14. The adhesion layer 12 is formulated to provide adhesion to the substrate 16, but also to be removed when no longer needed without damaging the substrate 16 or leaving any residue on the substrate 16. Adhesion layer 12 can be of any desired formulation now know in the art or later developed for the particular surface being protected. As is also known in the art, the adhesion layer is preferably made with a very smooth surface to facilitate intimate contact with the substrate surface.

As seen in FIG. 1, the release layer 14 comprises a three-dimensional release surface 15. In this embodiment, the release surface 15 comprises a plurality of protrusions 13 that are raised from the planar portion of release surface 15. The raised protrusions create a physical separation between the masking film 10 and an adjacent substrate in a stack. The plurality of protrusions 13 protect the substrate 16 during handling and allow one substrate to be separated from another more easily. In this particular embodiment, the release layer comprises a formed film in which protrusions 13 are integral extensions of the release layer 14.

The release surface 15 may comprise protrusions 13 that have an average height, as measured from the base surface 15 of the film, of greater than 50 microns. In certain embodiments, the average height of the protrusions may be greater than 100 microns. In certain embodiments, the release surface of the release layer comprises at least one of a plurality of protrusions, a plurality of three-dimensional apertures, a deeply embossed structure, or combinations thereof.

In the embodiment of FIG. 1, the three-dimensional protrusions 13 comprise apertured protrusions in the shape of cones or funnels and have an opening or aperture 11 in the apex of the protrusion 13. It is understood, however, that the protrusions need not be apertured and, in fact, are preferably not apertured. The apertures create an opportunity for debris to collect or be trapped in the film. The debris can then scratch or otherwise damage the substrate surface. It will be appreciated and understood that the three dimensional film used as release layer 14 can be oriented in the direction opposite the direction shown in FIG. 1, wherein the protrusions 13 would be oriented towards and in contact with adhesion layer 14.

Figure 1A:
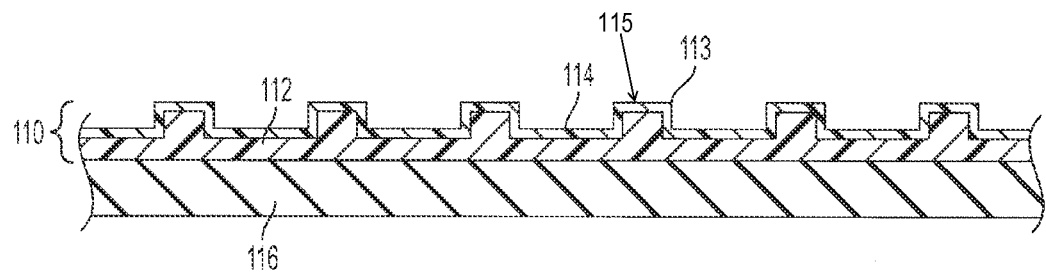
FIG. 1A is a cross sectional view of a masking film shown adhered to a substrate and comprising a release layer and an adhesion layer wherein the release layer comprises a three-dimensional release surface having a rhomboid embossed pattern.

FIG. 1A shows another embodiment of a masking film 110 is adhered to a substrate 116. The masking film 110 comprises an adhesion layer 112 and a release layer 114. The release layer 114 has a release surface 115 comprising a plurality of three-dimensional protrusions 113 extending from the release surface 115. In the embodiment of FIG. 1A, the release layer 114 may conveniently be formed by a deep embossing process.

Figure 1B:
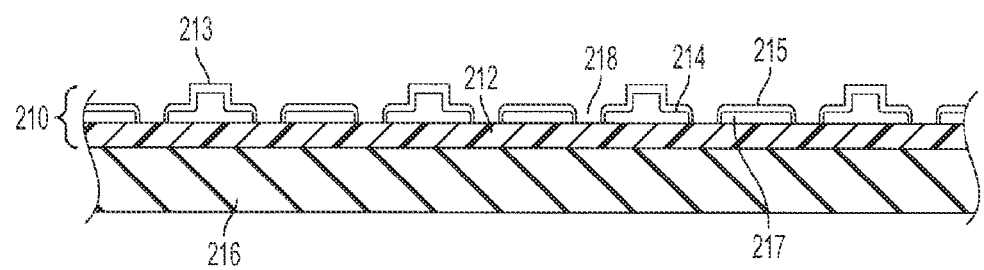
FIG. 1B is a cross sectional view of a masking film shown adhered to a substrate and comprising a release layer and an adhesion layer wherein the release layer comprises a multiplanar film.

With reference to FIG. 1B, another embodiment of the masking film is shown. In this embodiment, the masking film 210 is shown adhered to a substrate 216. The masking film 210 comprises an adhesion layer 212 and a release layer 214. The release layer 214 in this embodiment comprises a multiplanar film. On one side, the multiplanar film 214 has a protrusions 213 extending upward from a planar surface 215 of the film. On the opposite side, the multiplanar film has a plurality of protrusions 217 that, in the embodiment shown, terminate in apertures 218 at the apex of the protrusion. As noted above, it will be appreciated that the film used as the release layer 214 may be inverted such that the protrusions 213 are oriented toward and in contact with the adhesion layer 212.

Embodiments also include masking films comprising more than two layers. A specific embodiment of a masking film comprises an adhesion layer, a core layer, and a release layer. At least one core layer may be interposed between the adhesion layer and the release layer of the masking film. The core layer(s) of such embodiment may comprise any polymer that improves the mechanical properties of the film, such as stiffness, modulus, tear resistance, etc. For example, the core layer may be formulated to reduce the potential damage of the smooth surface of the adhesion layer during manufacturing and use of the film, or to improve the film's modulus. In certain embodiments, the masking film should have a modulus of greater than 15,000 psi (103.4 MPa). In certain embodiments, the modulus of the masking film may be greater than 15,000 psi (103.4 MPa) and less than 350,000 psi (2413.17 MPa). In certain embodiments, the release layer should have a modulus of 240,000 psi (1654.74 MPA) (±15%). The modulus in this range is desired to provide protection to the adhesion layer without affecting the wetting characteristics of the masking film.

For example, the core layer may be any thermoplastic, thermoset, or elastic polymer, as described herein, for example, that provides the desired properties to the masking film. In certain embodiments, the core layer may comprise a polymer selected from polyethylene, low density polyethylene, linear low density polyethylene, high density polyethylene, medium density polyethylene, polypropylene, random copolymer polypropylene, polypropylene impact copolymers, metallocence polyolefin, metallocene linear low density polyethylene, plastomers, poly (ethylene-co-vinyl acetate), copolymers of an acrylic acid, poly (ethylene-co-acrylic acid), poly (ethylene-co-methyl acrylate), cyclic olefin polymers, polyamides, poly (ethylene-co-n-butyl acrylate), polyvinyl chloride, nylon, polyester, and combinations thereof. The core layer can aid in providing the desired opacity and/or color, stiffness and toughness to the multilayer masking film.

Embodiments of the masking film may comprise two release surfaces. The films with two release surfaces may be monolayer or multilayer films.

Figure 2:
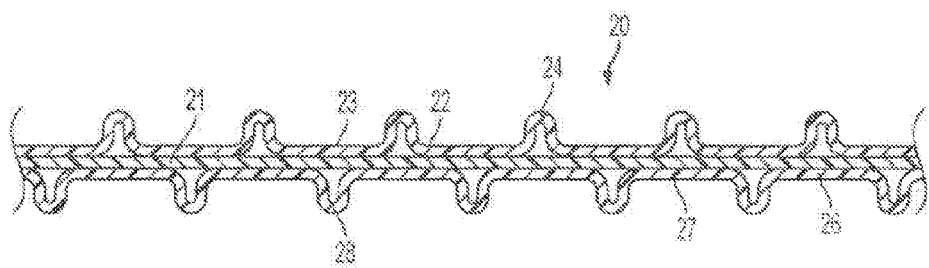
FIG. 2 is a cross sectional view of a masking film having a first release layer, a core layer, and a second release layer, wherein each release layer comprises a three-dimensional release surface having a plurality of unapertured protrusions.

FIG. 2 depicts an embodiment of a masking film 20 comprising a core layer 21, a first release layer 22 and a second release layer 26. Each release layer 22, 26 has a release surface 23, 27, respectively. The release surfaces 23, 27 comprise three-dimensional surfaces having a plurality of protrusions 24, 28, respectively. The protrusions are integral extensions of the release layers. In the embodiment shown in FIG. 2, the three-dimensional protrusions 24, 28 are unapertured, but still have a characteristic cone shape of a vacuum formed, or hydroformed, film.

Other embodiments of the masking film may omit the core layer 21 and may, for example, comprise two three-dimensional films laminated together such that the three-dimensional surfaces are oriented outwardly.

Figure 3:
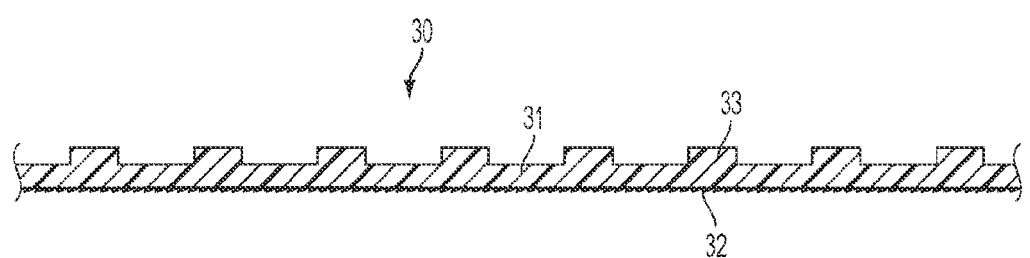
FIG. 3 is a cross sectional view of a masking film comprising a single layer film having two release surfaces.

The release surfaces on both sides of the masking film may be similar or differ in structure or properties. For example, the release surfaces may have different structures, patterns, loft, mesh count, or can be made from different materials. FIG. 3 depicts an embodiment of a single layer masking film 30 comprising two release surfaces 31, 32. Release surface 31 comprises a three-dimensional surface having a plurality of embossments 33. Release surface 32 comprises a matte surface having a surface roughness of between 5 and 100 microinch (0.127µ and 2.54µ).

Figure 4:
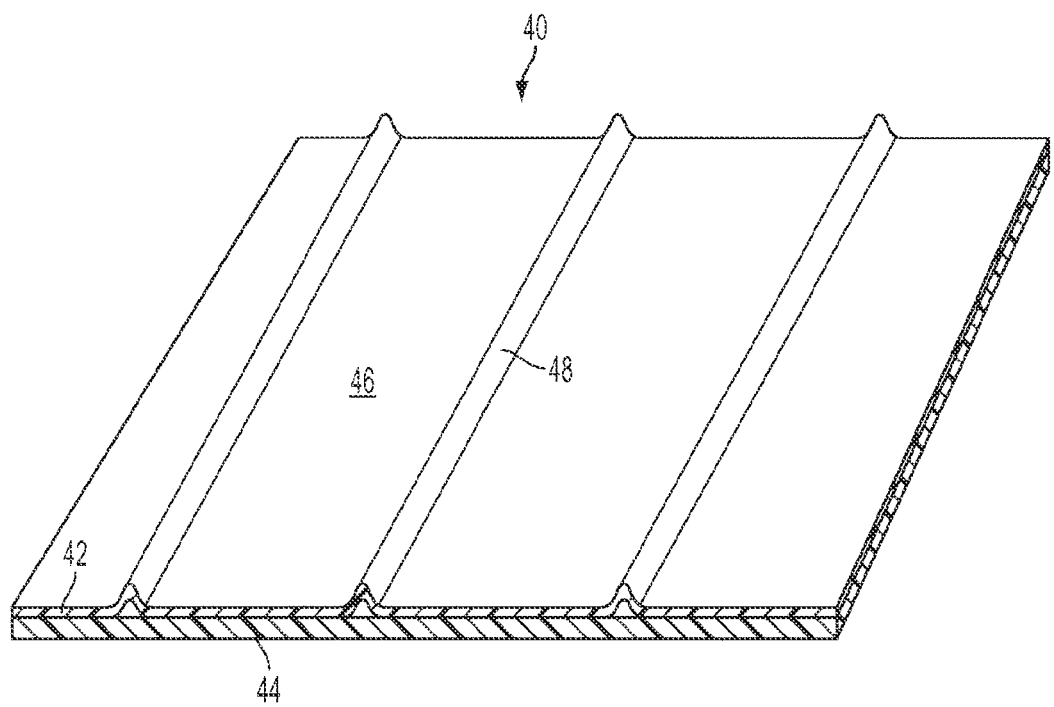
FIG. 4 is a perspective view of a masking film having an adhesion layer and a release layer with a three-dimensional release surface comprising spaced apart longitudinal ribs.

With reference now made to FIG. 4, a masking film 40 comprises a release layer 42 and an adhesion layer 44. The release layer 42 comprises a release layer 46 having a plurality of spaced apart raised ribs or ridges 48. Such films may be conveniently made by casting a molten polymer onto a forming drum having raised ribs or wires. As the polymer cools to form the film, the film surface will correspond to the ribs or wires, resulting in continuous raised ridges 48 in the film. The release layer 42 can then be coated or laminated to an adhesion layer 44. Alternatively, the masking film 40 can be made by coextruding the release layer 42 and the adhesion layer 44 onto a forming structure having a plurality of spaced apart channels or grooves and then subjecting the coextrusion to a vacuum (as discussed above) to draw the polymer forming the release layer into the grooves. As the polymer cools, the film will form ridges corresponding to the location where the polymer was drawn into the groove. Care must be taken to ensure that the surface of the release layer 44 does not get drawn into the grooves so that the adhesion layer remains as smooth as possible. Other methods of making the films may also be used to advantage.

Figure 4A:
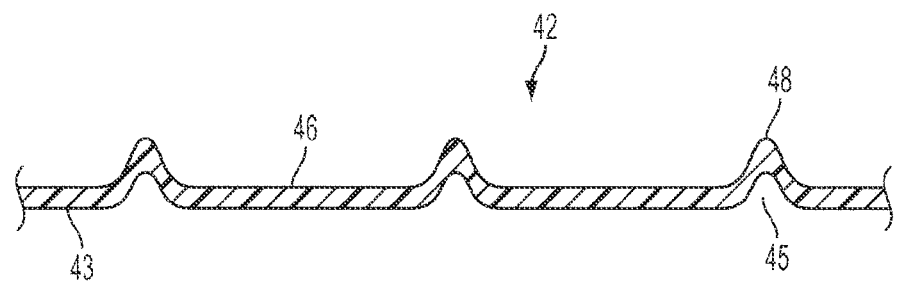
FIG. 4A is a cross sectional view of a masking film similar to the embodiment of FIG. 4, except without any adhesion layer.

FIG. 4A depicts a cross sectional view of the release layer 42 of the embodiment of FIG. 4. In the embodiment shown in FIG. 4A, the masking film is a monolayer film 42 having a release surface 46 comprising a plurality of spaced apart, three-dimensional raised ridges 48 formed integral with the release surface 46 as in FIG. 4. The masking film further comprises a second surface 43 opposite the release surface 46. Second surface 43 of release layer 42 has a plurality of air spaces 45 corresponding to the underside of the raised ribs 48.

The ridges 48 in the embodiments of FIGS. 4 and 4A provide a significant rigidity to the films. This is advantageous for the embodiment of FIG. 4A in particular where the film may be used as a replacement for paper in a stack of substrates.

Figure 5:
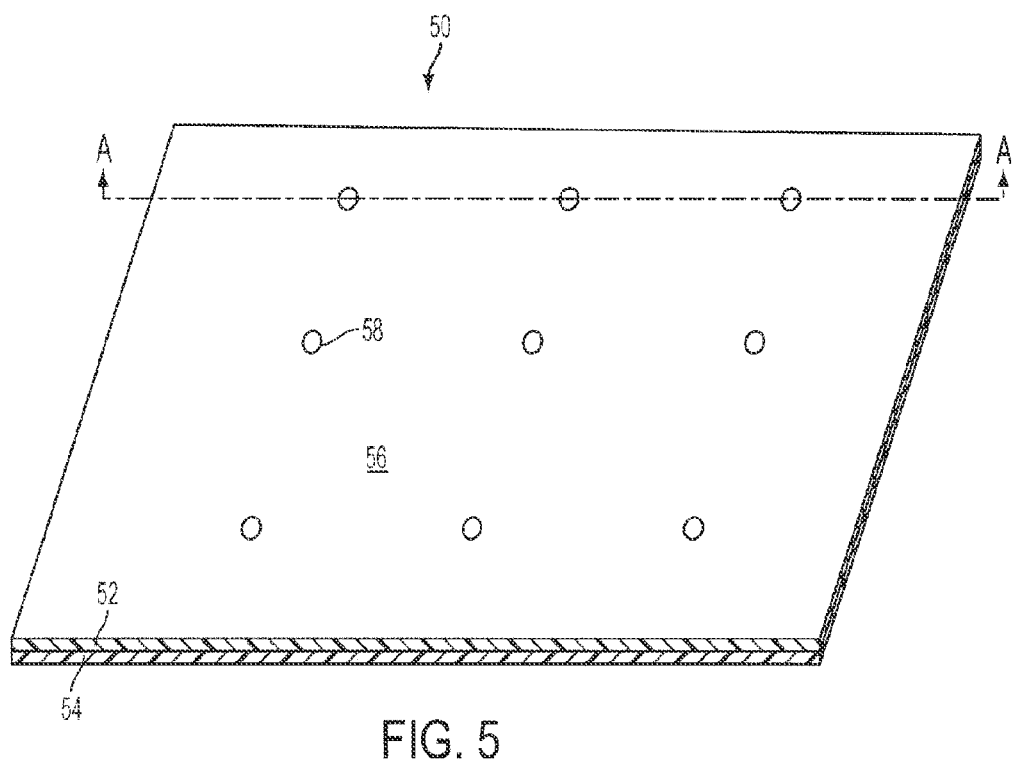
FIG. 5 is a perspective view of a masking film having an adhesion layer and a release layer having a three-dimensional surface comprising polymer beads.
Figure 5A:
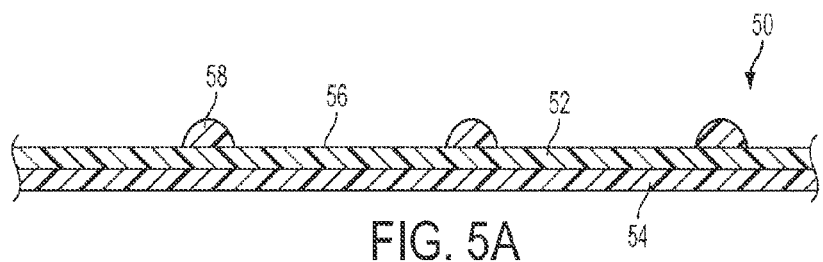
FIG. 5A is a cross sectional view of the masking film of FIG. 5, as seen along line and arrows A-A of FIG. 5.

FIGS. 5 and 5A shows a masking film 50 comprising a release layer 52 and an adhesion layer 54. Release layer 52 comprises a release surface 56 having a plurality of polymeric beads 58 disposed thereon. In contrast to the other embodiments described above, the beads 58 are not formed as integral extensions of the release layer 52. Rather, the beads 58 comprise individual, discrete beads of polymeric material, such as polyethylene, applied to the surface of the film.

Polymer beads can be applied via an impact printing process (such a gravure printing), a non-impact printing process (such as ink jet printing), a glue application apparatus, or any other apparatus capable of ejecting or depositing discrete polymer beads in molten, semi-molten, or solid form.

In other embodiments, discrete polymer beads may be applied to the surface of the release layer while the beads are in a solid form and the release layer is in a semi-molten or softened state. In other embodiments, the beads will be applied while the polymeric material is at, above or near the melting temperature. To keep the beads from spreading into the film layer, it may be advantageous to quench the polymer bead by contacting the surface of the release layer with a quenching roll.

The polymer beads 58 may comprise any polymer material that can be applied to the release layer 56 and remain sufficiently adhered to the release layer for the intended purpose. The polymer beads may be of any size, shape, dimension, pattern or spacing desired for the particular use of the film.

Figure 6:
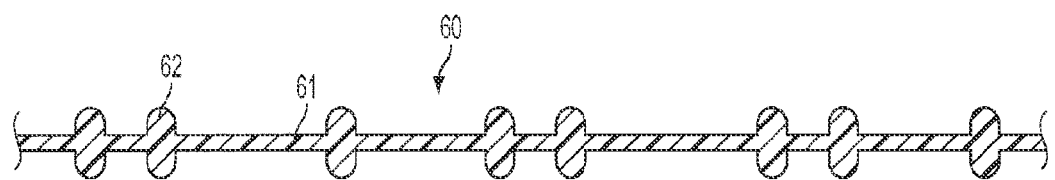
FIG. 6 is a cross sectional view of another embodiment of a film with two three-dimensional release surfaces.

FIG. 6 depicts an embodiment of a masking film 60 having a planar portion 61 and a plurality of protrusions 62 formed integral with the planar portion 61. The protrusions 62 extend on either side of the planar portion 61. In the embodiment shown, the protrusions 62 are in registration on either side of the film, but this does not necessarily need to be the case.

Figure 7:
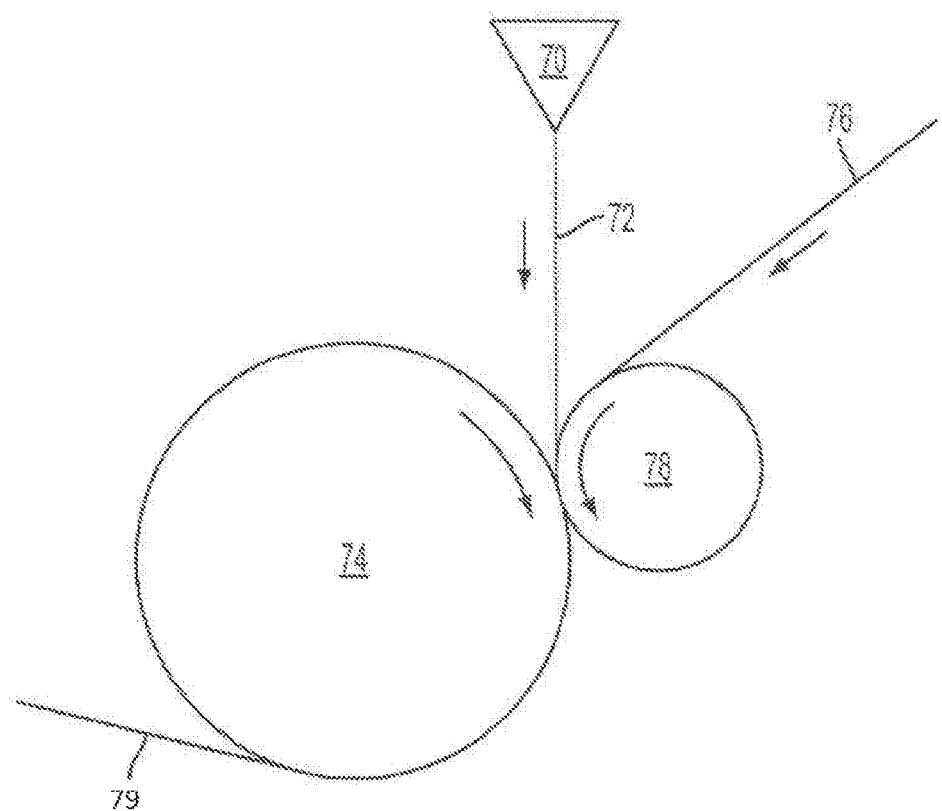
FIG. 7 is a schematic illustration of a vacuum lamination process.

FIG. 7 is a schematic illustration of one process that may be used to produce the masking films. The polymers are mixed and melted in an extruder (not shown) and passed through a die 70, where the polymer emerges in a molten stream or curtain 72 onto roll 74. Depending on the embodiment being produced, roll 74 may comprise a smooth casting roll, a forming structure, or a textured casting roll. Web 76 is brought together with web 72 at the nip formed between roll 74 and roll 78. The two webs, 72, 76 are laminated in the nip and then removed from roll 74 to produce the final film structure 79. If desired, a vacuum may be applied to assist in the lamination, as is known in the art and taught, for example, in U.S. Pat. No. 4,995,930, incorporated herein by reference. Again, depending on the particular embodiment being produced, the web 76 may be an apertured or unapertured three-dimensional film, an embossed film, a deep embossed film, an adhesive layer, etc.

For example, if desired to make the masking film 10 of FIG. 1, the polymeric material intended for use as the adhesion layer 12 would be extruded from die 70 as molten web 72 onto roll 74, which in this case would comprise a smooth surface chill roll. Web 74, comprising three-dimensional apertured film 14 of FIG. 1, would be brought into contact with the web 72 at the nip formed between pressure roll 78 and chill roll 74. The combination of heat and pressure at the nip would cause the apertured film 76 to become adhered to the adhesion layer 72 whereby the laminated film 10 of FIG. 1 would emerge as web 79.

If the masking film 20 from FIG. 2 was desired, the web 72 could comprise a coextrusion of the materials for first release layer 22 and core layer 21 which would be cast onto roll 74, which in such an embodiment would comprise a forming structure. The second release layer 26 would be brought into the nip as web 76. By applying vacuum to the web 72 through the forming structure 74, as is known in the art, the second release layer 26 would be formed and the final film 20 would emerge from roll 74 as web 79.

Figure 8:
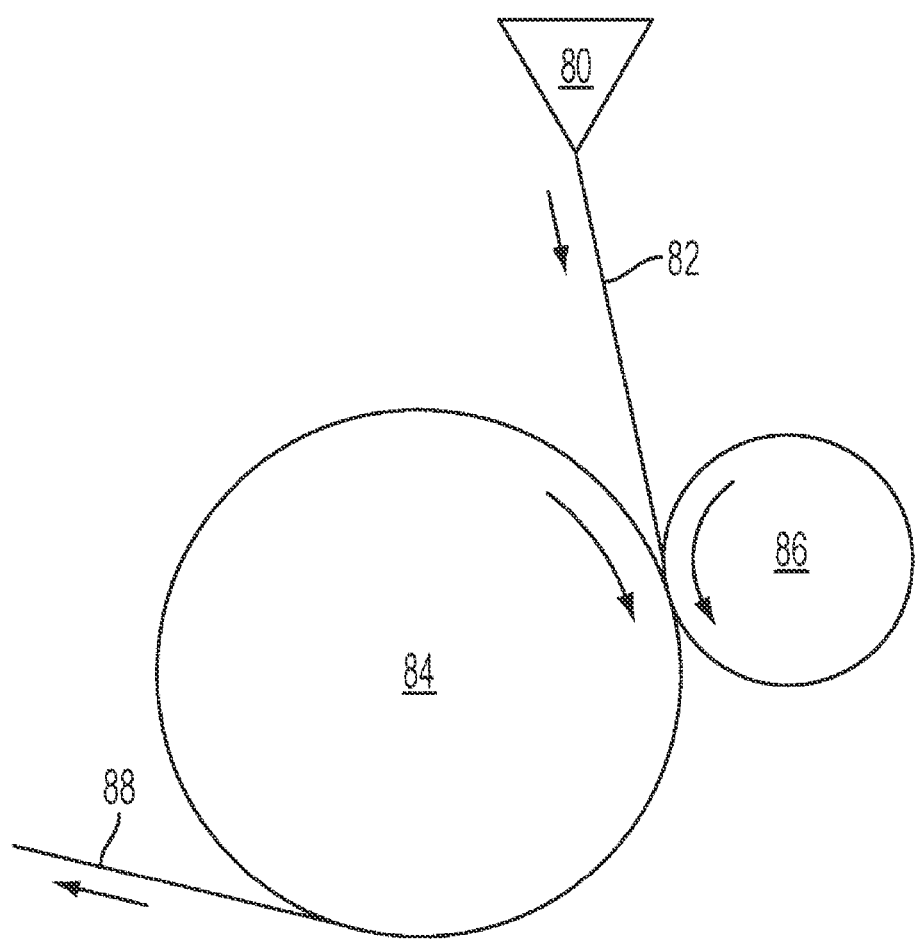
FIG. 8 is a schematic illustration of an embossing and/or vacuum forming process useful in making certain of the embodiments.

FIG. 8 illustrates a schematic diagram of another process that may be used to produce certain of the embodiments. In the process of FIG. 8, a molten polymer web 82 is extruded from die 80 onto roll 84. As with the process of FIG. 7, roll 84 may comprise a forming structure, a smooth surface casting roll, a textured surface casting roll, an embossing roll, etc. Nip roll 86 can preferably comprise a textured roll or embossing roll, but may also be a smooth roll if desired. The process of FIG. 8 is particularly advantageous in making masking films such as the embodiments shown in FIGS. 3, 4A and 6, for example. In the embodiment of FIG. 6 in particular, the nip roll 86 may be a thin screen disposed on a support roll of rubber or other material, The thin screen would impart the surface topography to one side of the film while the surface of roll 84 would impart the surface topography to the opposite side of the film, preferably with the assistance of vacuum.

The masking films may be interleaved between stacks of substrates to protect the substrates during shipping, use, manufacture, or assembly. The masking films may be particularly useful for use in stacks of substrates with smooth surfaces, such as glass or other optical media. The masking film may be placed in between substrates to protect the substrates and allow the desired release characteristics.

A masking film that resists buildup of an electrostatic charge is desirable in many applications. In certain applications, the masking film protects portions of the film not only from mechanical damage and chemical damage or contamination, but also from contamination from particulates, such as dust. Therefore, it is desired in certain applications, such as layered optical screens, that the masking films themselves do not transfer dust or other particles to the surface of the substrate. In order to improve the antistatic properties of the masking film, an antistatic agent may be added to the adhesion layer and/or the release layer. Preferably, the adhesion layer or release layer will include an antistatic agent that will not migrate to the surface of the film and, thus having the potential of contaminating the surface of the substrate, such as an ionomer. Therefore, to reduce the dust on the surface, the adhesion layer in specific embodiments may comprise an ionomer. An ionomer is a polymer having unique physical properties due to ionic interactions of discrete regions of the polymer components. Most ionomers are polymers in which a small but significant proportion of the constituent monomers have ionic groups. In certain embodiments, the ionomer may be a potassium ionomer.

Without affecting the basic and novel characteristics, any layer of the masking films of the present disclosure may comprise at least one anti-oxidant, colorant, pigment, clarifier, and/or nucleating agent.

In a preferred embodiment, when a multiple layered film is used in the disclosure, any layer, such as the adhesion layer, a core layer and/or release layer, may be co-extruded using any co-extrusion process known in the art. The use of co-extrusion allows for the relatively simple and easy manufacture of a multi-layered masking film composed of distinct layers, each performing specific functions. Although co-extrusion of the improved multi-layered masking film of the present disclosure is preferred, it is again noted that the masking film can be mono-layered or multi-layered and that, regardless of form, the masking film can be produced using any other suitable method, if desired.

Any of a variety of conventional methods can be utilized for applying the multi-layer (or monolayer) masking film to the textured surface of the substrate to be protected. Preferably, the multi-layer film is taken off from a roll and directly applied to the surface by means of a nip roll or similar system. In this manner, the smooth side of the multi-layer film is applied to and pressed against the textured substrate in one operation. If desired, the resulting lamination may be passed through compression rolls or the like for further processing. Other suitable techniques for forming the laminations of this disclosure will be readily apparent to those skilled in the art upon reading the description herein.

EXAMPLES

Many other variations, modifications, and alternate embodiments may be made in the article and techniques described, by those skilled in the art, without departing from the concept of the present disclosure. Accordingly, it should be clearly understood that the article and methods referred to in the foregoing description and following examples are illustrative only and are not intended as limitations on the scope of this disclosure.

Example 1

A series of films were prepared having the compositions of Table 1.

TABLE 1

| No. | Adhesion Layer | Release Layer |
| --- | --- | --- |
| 1 | 97.5% Low density polyethylene 2.5% of slip agent masterbatch (1% slip agent in low density polyethylene) | 100% low density polyethylene vacuum dimpled in an 11.2 mesh hex pattern |
| 2 | 97.5% Low density polyethylene 2.5% of slip agent masterbatch (1% slip agent in low density polyethylene) | 100% low density polyethylene film vacuum dimpled in a 22 mesh hex pattern |
| 3 | 97.5% Low density polyethylene 2.5% of slip agent masterbatch (1% slip agent in low density polyethylene) | 24 GSM cast film of low density, linear low density, high density polyethylene and white pigment concentrate embossed in a Rombo pattern |
| 4 | 97.5% Low density polyethylene 2.5% of slip agent masterbatch (1% slip agent in low density polyethylene) | N/A |
| 5 | 97.5% Low density polyethylene 2.5% of slip agent masterbatch (1% slip agent in low density polyethylene) | 24 GSM cast film of low density, linear low density, high density polyethylene and white pigment concentrate embossed in a Rombo pattern |
| 6 | 97.5% Low density polyethylene 2.5% of slip agent masterbatch (1% slip agent in low density polyethylene) | Vacuum formed apertured film of high and low density polyethylene with an 8.75 mesh hex pattern |
| 7 | 12% styrene-ethylene/butylene-styrene block copolymer 88% R2002 Bynel ® resin | 97.5% Low density polyethylene 2.5% of slip agent masterbatch (1% slip agent in low density polyethylene) |
| 8 | 12% styrene-ethylene/butylene-styrene block copolymer 88% R2002 Bynel ® resin | 100% low density polyethylene vacuum dimpled in an 11.2 mesh hex pattern |
| 9 | 12% styrene-ethylene/butylene-styrene block copolymer 88% R2002 Bynel ® resin | Vacuum formed apertured film of high and low density polyethylene with an 8.75 mesh hex pattern |
| 10 | 12% styrene-ethylene/butylene-styrene block copolymer 88% R2002 Bynel ® resin | 100% low density polyethylene film vacuum dimpled in a 22 mesh hex pattern |

TABLE 1-continued

| No. | Adhesion Layer | Release Layer |
|---|---|---|
| 11 | 12% styrene-ethylene/butylene-styrene block copolymer 88% R2002 Bynel ® resin | 24 GSM cast film of low density, linear low density, high density polyethylene and white pigment concentrate embossed in a Rombo pattern |

Sample No. 4 is a monolayer film. Sample no. 7 is a coextruded film. All other samples were prepared by laminating two films together. The sample films were measured for basis weight, haze and thickness (loft) and tested for adhesion. Properties and data are set forth in Table 2.

TABLE 2

| Sample No. | Basis Weight (gsm) | Haze (%) | Thickness (mm) | Adhesion (g) |
|---|---|---|---|---|
| 1 | 48.13 | 27.6 | 0.131 | 25.3 |
| 2 | 47.79 | 59.6 | 0.114 | 49.0 |
| 3 | 48.05 | — | 0.079 | 22.3 |
| 4 | 25.20 | 85.3 | 0.031 | 114.8 |
| 5 | 48.74 | — | 0.080 | 48.0 |
| 6 | 54.99 | 46.6 | 0.358 | 5.6 |
| 7 | 26.00 | 84.0 | 0.034 | 792.0 |
| 8 | 53.18 | 26.4 | 0.173 | 333.9 |
| 9 | 56.02 | 45.5 | 0.560 | 53.1 |
| 10 | 47.86 | 51.3 | 0.089 | 431.7 |
| 11 | 52.13 | — | 0.083 | 439.9 |

Example 2

A series of monolayer polyethylene films were made having one smooth adhesion surface and an opposite release surface. The films were made by casting the low density polyethylene/slip agent blend used in the earlier examples onto a smooth chill roll. Pressure was applied to the opposite side of the film with a textured or engraved embossing roll, as seen in FIG. 8. The textured embossing roll was made of rubber and had a surface texture with a roughness of 1.397μ (55 microinch). The engraved embossing roll was also made of rubber and had an series of deep engraved grooves in a diamond shape pattern. Each surface of the film was then tested for adhesion using a special developmental adhesion strength test method in a 180° peel test. Results are reported in Table 3.

TABLE 3

| | | Textured Release Surface | | Engraved embossed release surface | |
|---|---|---|---|---|---|
| Sample No. | Basis Weight (gsm) | Embossed Thickness (mm) | Adhesion (g) | Embossed Thickness (mm) | Adhesion (g) |
| 12 | 70 | .100 | 194 | .100 | 185 |
| 13 | 80 | .110 | 206 | .103 | 160 |
| 14 | 90 | .124 | 267 | .155 | 230 |

Example 3

A series of polyethylene films were made having a release surface on each side. The films were made by casting the low density polyethylene/slip agent blend used in the earlier examples onto an engraved chill roll. The chill roll had an engraved surface containing a series of deep engraved grooves in the shape of a diamond pattern. Pressure was applied to the opposite side of the film with a textured embossing roll, as seen in FIG. 8. The textured embossing roll was made of rubber and had a surface texture with a roughness of 1.397μ (55 microinch). Each surface of the film was then tested for adhesion. Results are reported in Table 4. As seen in Table 4, in this embodiment, the films did not adhere to the substrate.

TABLE 4

| | Basis | Embossed Thickness (mm) | | Adhesion (g) | |
|---|---|---|---|---|---|
| Sample No. | weight (gsm) | Textured side | Engraved side | Textured side | Engraved side |
| 15 | 37 | 0.060 | 0.060 | 0 | 0 |
| 16 | 46 | 0.060 | 0.080 | 0 | 0 |
| 17 | 55 | 0.076 | 0.092 | 0 | 0 |

Example 4

A series of three-layer coextruded films were prepared having the composition set forth in Table 5 (layer 2 was the core layer and layers 1 and 3 are outer or "skin" layers). The films were cast onto a forming screen having thin wires wrapped about the periphery and subjected to vacuum to form the film materials depicted in FIG. 4A. The films were tested for a variety of physical properties. Results are reported in Table 6.

TABLE 5

| Sample No. | Layer 1 | Layer 2 | Layer 3 |
|---|---|---|---|
| 17 | HDPE | 88% MDPE 12% LDPE | HDPE |
| 18 | HDPE | 88% MDPE 12% LDPE | HDPE |
| 19 | HDPE | 60% CaCO$_3$ 30% MDPE 10% LDPE | HDPE |
| 20 | HDPE | 86% MDPE 12% LDPE 2% TiO$_2$ | HDPE |
| 21 | HDPE | 86% MDPE 12% LDPE 2% TiO$_2$ | HDPE |
| 22 | HDPE | 86% MDPE 12% LDPE 2% TiO$_2$ | HDPE |

TABLE 6

| | Sample No. | | | | | |
|---|---|---|---|---|---|---|
| | 17 | 18 | 19 | 20 | 21 | 22 |
| Basis Weight (gsm) | 49.1 | 69.5 | 38.8 | 39.3 | 61.4 | 31.2 |
| Gurley Surface GU | 157 | 168 | 123 | 169 | 167 | 139 |
| Embossed thickness (mm) | 0.475 | 0.453 | 0.202 | 0.369 | 0.533 | 0.307 |

TABLE 6-continued

| | Sample No. | | | | | |
|---|---|---|---|---|---|---|
| | 17 | 18 | 19 | 20 | 21 | 22 |
| Circular bend stiffness (gmf) | 443 | 1084 | 167 | 352 | 806 | 238 |
| Compressibility (%) | 30.8 | 18.4 | 32.4 | 36 | 22.5 | 41.5 |
| Resiliency (%) | 85.4 | 93.3 | 86.4 | 78.7 | 89.5 | 81.22 |
| Secant Modulus @1% strain (Kgf) | 30.5 | 46.3 | 23.5 | 24.8 | 37.3 | 19.4 |
| Modulus (psi) | 165,887 | 209,892 | 209,071 | 130,811 | 199,071 | 102,677 |
| Peak Load (gf/inch) | 3463 | 4364 | 1604 | 2884 | 4561 | 2618 |
| Elongation @ break (%) | 630 | 538 | 11 | 652 | 690 | 654 |

The invention claimed is:

1. A masking film removably attachable to a substrate comprising an adhesion layer and a release layer, said release layer comprising a release surface on a side of the release layer opposite the adhesion layer, the release surface having a planar portion and a plurality of three-dimensional protrusions extending from the planar portion, wherein the three-dimensional protrusions are integral extensions of the release layer, wherein the plurality of protrusions have an average height of greater than 50 microns and up to 1069 microns, as measured from the planar portion, wherein the adhesion layer comprises a smooth surface having a roughness from 0 to 1.524 microns on a side of the adhesion layer opposite the release layer, and wherein the adhesion layer remains with the release layer when the masking film is removed from the substrate.

2. The masking film of claim 1, wherein the protrusions are vacuum formed protrusions.

3. The masking film of claim 1, wherein the protrusions are hydroformed protrusions.

4. The masking film of claim 1, wherein the protrusions are mechanically deformed protrusions.

5. The masking film of claim 4, wherein the protrusions are deep embossed protrusions having an average height of greater than 100 microns.

6. The masking film of claim 1, further comprising at least one intermediate layer disposed between the release layer and the adhesion layer.

7. The masking film of claim 1, wherein the adhesion layer comprises a metallocene polyolefin.

* * * * *